Figure 1:
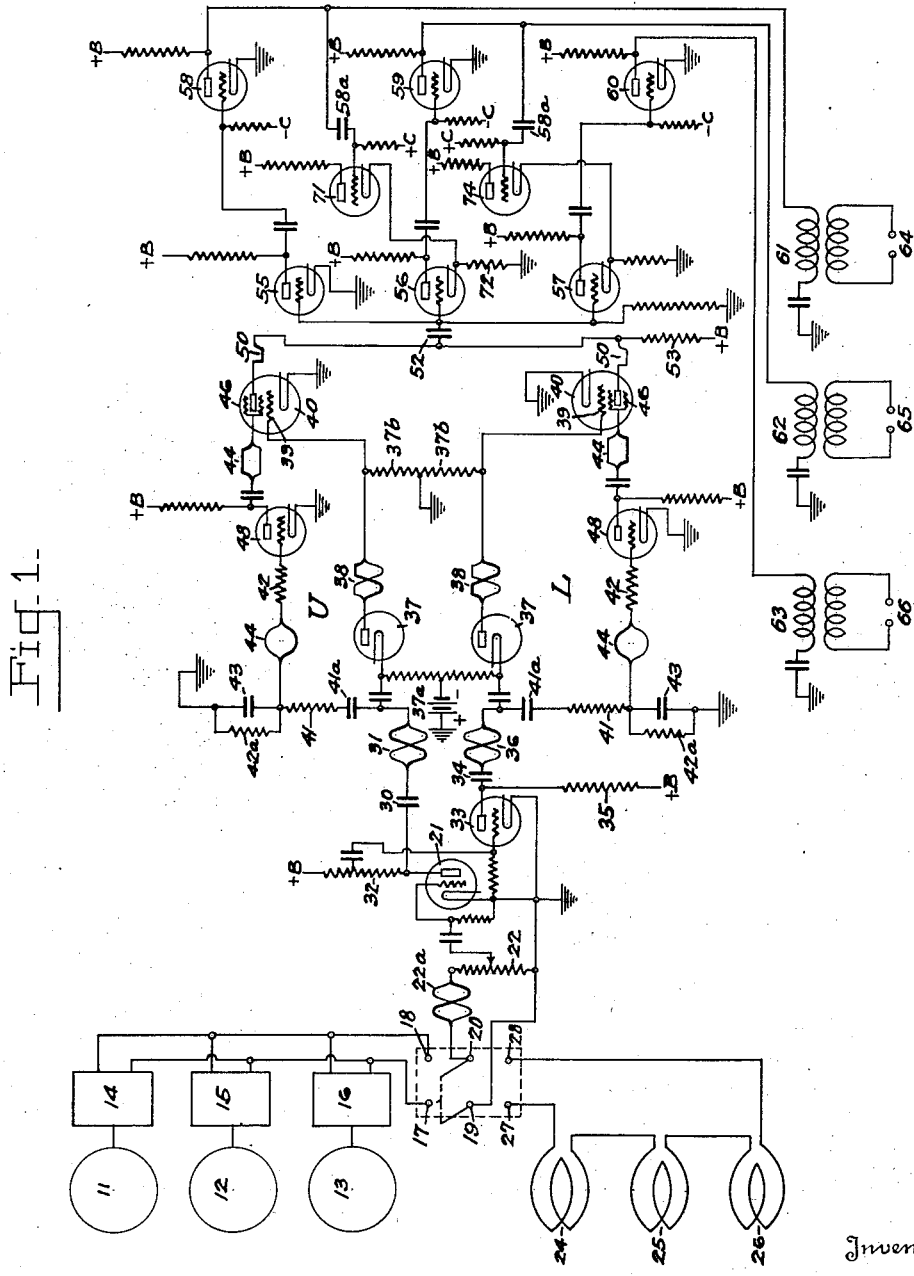

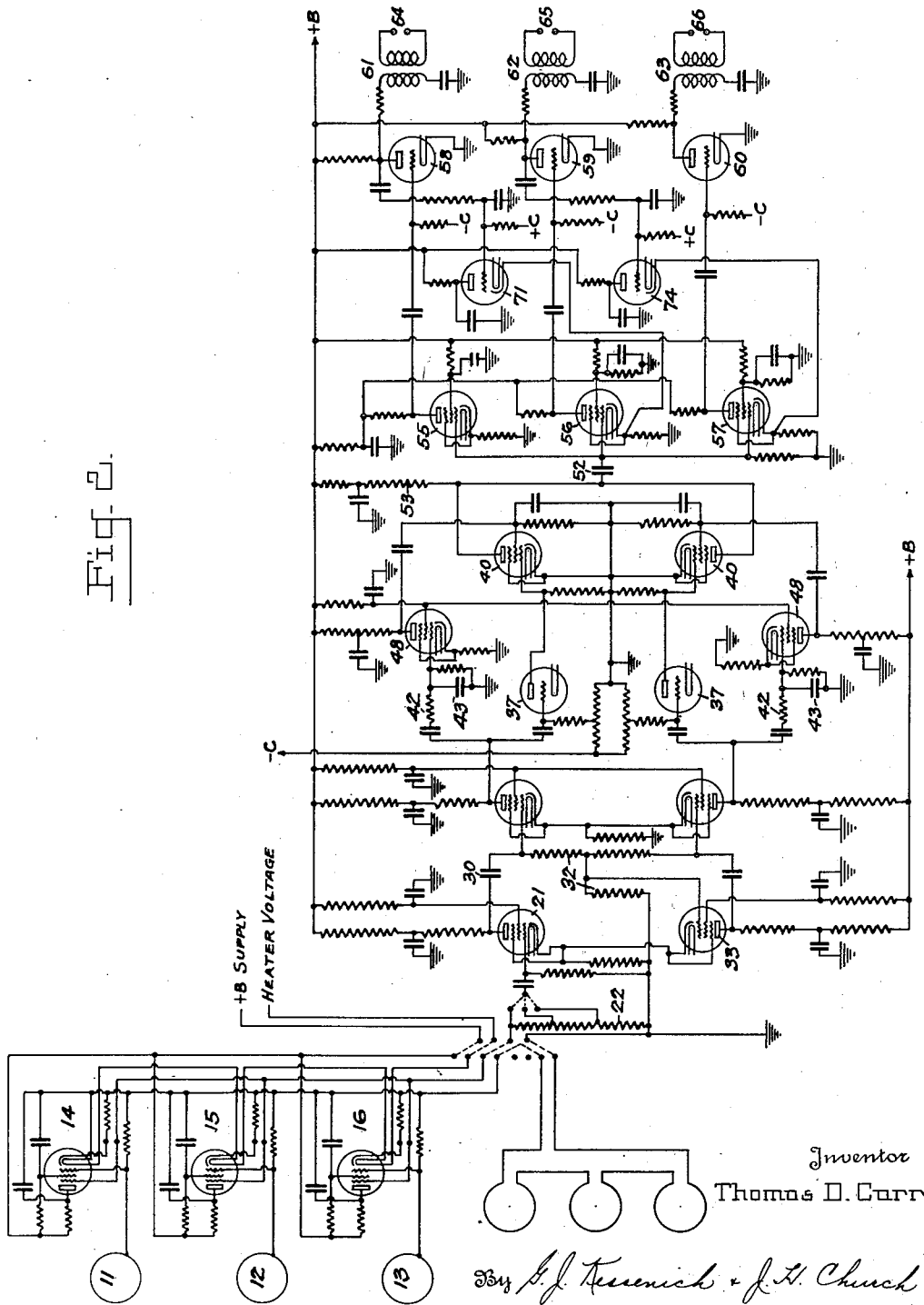

Patented Feb. 20, 1945

2,369,659

UNITED STATES PATENT OFFICE 2,369,659

ELECTRONIC CONTROL CIRCUIT

Thomas D. Carr, Perryman, Md.

Application July 4, 1942, Serial No. 449,833

9 Claims. (Cl. 177—352)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to electronic circuits, and is concerned particularly with circuits and apparatus adapted to receive certain limited types of A. C. signals and to interpret them in such a manner as to operate a recording instrumentality.

The particular field with which the invention is concerned is the measurement of projectile velocities. A projectile is caused to pass close to two or more known stations on its trajectory. When the time of flight from station to station is measured, and the distance from station to station is known, the projectile velocity may be calculated readily. Two general methods of measuring station to station time have included the use of electromagnetic impulses generated by the passage of the projectile in a magnetized state through spaced inductances or the use of electrostatic impulses picked up as the projectile in an electrostatically charged state passes spaced antennas. In both methods, the electrical impulse has the general form of a single cycle A. C. wave—i. e., a voltage pulse of one polarity which changes quickly to a voltage pulse of opposite polarity as the bullet passes the center of the inductance or the electrostatic antenna. Such impulses build up slowly as the projectile approaches the antenna or inductance and change their magnitude and polarity at a very high rate when the projectile is in the close proximity thereof. With the electromagnetic method, the polarity of the first pulse is controllable at will since the direction of magnetization of the projectile is readily controllable. In the electrostatic method, however, the charge on the projectile is not readily controllable—either as to polarity or magnitude. Thus, in order to have a chronograph system for electrostatic pickup, the circuit must be designed to operate when the initial signal pulse is either positive or negative and of an amplitude which may lie anywhere within a wide range. For either electrostatic or inductance pickup, the circuit must be designed to operate in some well defined zone of the total signal impulse, preferably at the zero or crossover point where the voltage changes polarity. Also, it is desirable to provide means to reject unwanted incidental or accidental impulses in the system. Objects of the invention include the provision of means to attain these desired characteristics. A further object is to provide a triggering circuit for sequentially operating power devices which record impulses equal in number to the number of pickup inductances or antennas on a chronograph, the power devices being operated sequentially as the projectile passes respective pickup devices.

Another object is to provide a circuit of general utility, capable of responding only to the crossover between the half cycle pulses of a single cycle A. C. wave regardless of the polarity of the first pulse. Another object is to provide a circuit which will respond only to a high rate of change in voltage of an electrical impulse provided it has been previously built up at a relatively slow rate.

Further objects will become apparent in reading the detailed description below in connection with the drawings, in which Figure 1 is a simplified functional wiring diagram of the circuit, and Figure 2 is a complete circuit diagram of an operative embodiment of the invention.

Reference may first be made to Figure 1. At the left end of the figure there are shown two sets of pickup assemblies, the upper set comprising a plurality of electrostatic antennas 11, 12 and 13 which are arranged in spaced disposition along the trajectory of a projectile. They may take the form of wire loops through which the projectile passes. The signal from each antenna is passed through an impedance transducer or impedance matching means, the several transducers being connected in parallel and being indicated at 14, 15 and 16. The outputs connect to a pair of switch points 17 and 18 which may be connected with switch points 19 and 20 connected to the grid and cathode of an amplifier 21. The input may be varied in intensity by adjustment of a potentiometer 22.

The second set of pickup assemblies comprises a plurality of serially connected inductances 24, 25 and 26 which provide an alternate means of picking up an impulse from the passage of a projectile therethrough. These coils are connected to switch points 27 and 28, connectible with the switch points 19 and 20 if the inductance method of pickup is desired in place of the electrostatic pickup afforded by the antennas. The inductance pickup may be used with magnetized projectiles whereas the electrostatic pickup will be used for projectiles which cannot be magnetized. In either case, the wave form of the input signal is as shown at 22a, the heavy lines illustrating the form when the first pulse is positive and the light lines illustrating the form when the first pulse is of negative polarity. Corresponding light and heavy lines throughout the circuit illustrate the corresponding resulting wave form at the respective points in the circuit.

The plate of the amplifier 21 is coupled through a condenser 30 to an upper circuit channel indicated at U, the signal wave form at this point being indicated at 31. The plate of the amplifier 21 is provided with positive B voltage through a resistor 32, and a tap from this resistor is connected to the grid of a phase inverting tube 33 whose plate is condenser coupled at 34 to a lower circuit channel indicated at L. The signal amplitude impressed on the grid of tube 33 is substantially the same as that impressed on the grid of the tube 21. The plate of the tube 33 is provided with positive B voltage through a resistor 35. The tube 33 gives substantially the same gain as the tube 21, and inverts the amplified signal from tube 21, as at 36, so that the signal is of opposite sign from that in the upper channel. A signal is thus passed simultaneously to both channels U and L. As stated above, if the first pulse of the original signal is positive the wave form of the signal at various successive points in each channel will be as indicated by heavy lines. If the first pulse of the original signal is negative, then the form at various points in each channel will be as indicated by the light lines. The action of both channels U and L is substantially the same, one serving to pass the proper signal when the original polarity is of one sign and the other serving to pass a proper signal when the original polarity is of other sign.

Each channel has an inner and an outer branch. The inner branch includes a diode limiter 37 the output of which is connected to a control grid 39 of a mixing tube 40. It functions in the following manner to limit the magnitude of the voltage applied to the grid 39 in order that the plate current in the tube 40 will be limited to a safe value. The negative bias 37a causes a steady current to flow through the limiter 37 and resistor 37b which thereby places a constant negative bias on the grid 39. However, because of the rectifying effect of the limiter 37, current can flow in only one direction through resistor 37b regardless of the form of the signal impressed on the limiter. In effect, therefore, the limiter 37 insures that only negative voltages will exist on the resistor 37b for which reason the grid 39 will never be able to acquire a voltage which is positive with respect to its cathode unless, of course, the characteristics of tube 40 should make it desirable to insert additional positive bias in the circuit of grid 39.

The outer branch of each of the channels U and L passes through resistors 41 and 42 to the grid of an amplifier 48, the resistor 41 being grounded through a condenser 43. The elements 41 and 43 comprise an integrating circuit which integrates both pulses of the cycle in order to produce a signal of the form shown at 44. The time constant of these elements (product of resistance by capacity) is very much greater than the length of the cycle comprising both pulses. The result is therefore that the condenser 43 is charged with the polarity of the first pulse and retains a charge of that polarity for a sufficient time to provide the voltage required of it during the cycle. The condenser 41a is large enough to have negligible impedance. The elements 41 and 43 are connected through the amplifier 48 to a screen grid 46 of the mixer 40. The grid of amplifier 48 is connected to ground by grid resistor 42a. The series resistor 42, when the grid of amplifier 48 is driven in a positive direction, limits the amplifier grid current to prevent amplifier overloading.

When the initial half cycle of the original signal pulse is positive as shown by the heavy lines, the elements 41, 43 and 48 serve to place upon the grid 46 of the mixer 40 a certain positive voltage which remains constant over a portion of the signal pulse interval during which the crossover occurs. The nature of the mixer 40 is such that it will conduct only when grid 46 is made positive in this manner and at the same time, grid 39 is not farther negative than a certain small amount. It is apparent that at the instant at which grid 46 first attains the above mentioned positive voltage, grid 39 is far negative, and tube 40 does not yet conduct. However, as the negative maximum of the signal 38 is passed and the crossover point approached in a positive direction the voltage of grid 39 swings past the point at which tube 40 begins to conduct, and the remainder of signal 38 is amplified, until grid 46 again drops to zero voltage. The resulting pulse is indicated at 50. The leading edge of pulse 50, which is almost vertical, occurs during an extremely short and well-defined time intervals the termini of which lie just before and just after the zero or crossover point of the original signal impulse.

As stated above, the upper channel will produce a negative triggering signal at its output when the initial polarity of the signal impulse is positive. When the initial polarity of the signal is negative, the lower channel will pass the triggering signal. That channel which does not pass a proper signal remains inactive due to the integrated negative pulse imposed upon the grid 46 of the mixer tube 40, this pulse being of such amplitude as to prevent possible triggering action of the mixer resulting from an initial positive impulse passed by the diode 37 to the control grid 39.

The plates of the mixer tubes 40 are connected together and are condenser coupled to an output circuit at 52 and are provided with positive B-voltage through a resistor 53.

The mixer tube output is connected to the grids of amplifier tubes 55, 56 and 57 whose plates respectively are provided with B-voltage through resistors and are condenser coupled to the grids of power tubes such thyratrons 58, 59 and 60. The plates of the thyratrons are connected respectively through the primaries of spark coils 61, 62 and 63 through condensers to ground. During standby, the ungrounded sides of the condensers are charged positively while the thyratron plates are also positive. When the thyratrons fire, their plates are grounded whereby the condensers discharge through the spark coil primaries. The secondaries of coils 61, 62 and 63 are connected to spark gaps 64, 65 and 66. The sparks from the gaps serve to mark a travelling tape at spaced intervals. The distance between spark perforations on the tape may be measured, and knowing the tape velocity and distance between antennas the average velocity of a projectile from one antenna to the next may be established.

In order that the power tubes 58, 59 and 60 may operate in sequence, cutoff provisions are made for the tubes 59 and 60 until such time as the power tube 58 has passed its power impulse. When the apparatus is set up for operation, the amplifier 55 is ready to operate while the amplifiers 56 and 57 are cut off, and as a bullet passes the first antenna or inductance, the grid of the amplifier 55 is driven negative and drives the grid of the power tube 58 positive to produce a spark at the gap 64.

A control tube 71 and the amplifier tube 56 possess a common cathode resistor 72. The grid of tube 71 is biased positively with respect to ground, whereas the grid of tube 56 is at ground potential. Tube 71 is normally in a conducting state, its plate current being such that the voltage drop across the cathode resistor 72 is slightly more positive, with respect to ground, than the bias on its grid. However, this positive cathode potential is more than sufficient to prevent tube 56, whose grid is at ground, from conducting. The grid of tube 71 is condenser coupled with the plate of thyratron 58 through condenser 58a. When the thyratron 58 is fired, the drop in its plate potential drives the grid of tube 71 far negative, cutting tube 71 off. Because of the long time constant of its grid circuit the tube 71 will remain cut off for the duration of the cycle of events. This removes the cut-off bias from the cathode of amplifier 56, enabling it to attain its own conduction equilibrium. Upon initiation of this conduction, the plate of 56 and the grid of thyratron 59 swing negatively, the potential of the grid returning rapidly thereafter to its original bias due to the short time constant of the coupling condenser and grid resistor. The second signal pulse 50 then cuts tube 56 off, firing thyratron 59 by driving its grid positive, thereby causing a spark at the gap 65.

As the thyratron 59 fires, it cuts off a second control tube 74, in turn cutting in, for conduction, the third amplifier 57. When the latter is cut off by the third signal impulse 50, the third thyratron 60 is fired to produce a spark at the gap 66. After firing, each of the thyratrons is extinguished by transient oscillations in its plate circuits or by drop in its plate voltage caused by the plate circuit resistor. The recovery time of each of the thyratrons after firing is long enough, due to the charging time of the condensers through the high resistances connecting each with the +B supply, to prevent prompt rebuilding of the plate voltages thereon. This allows all three to fire in sequence before any may be fired again. It is obvious, therefore, that, even though signal impulses 50 are carried to all grids of amplifiers 55, 56 and 57, they will operate in proper sequence due to the control tubes 71 and 74.

The spark gaps 64, 65 and 66 in connection with the triggering circuits are merely examples of means for making a record mark, for instance, on the tape of the so-called Aberdeen chronograph. Other types of chronographs could be adapted to the system.

The series of signals at 50 could, for instance, be recorded on a camera film upon a time datum produced by a wave of accurately known frequency photographed on the film concurrently with the antenna impulse. For other types of recordings, certain simplifications could be made in the circuit system while its functional principles are retained.

Figure 2 includes all of the condensers, resistors, and connections which are necessary to produce a fully operative circuit system. The circuit of Figure 2 is basically the same, from a functional standpoint, as the circuit of Figure 1 and includes the same reference numbers for corresponding parts. Figure 2 also shows an extra stage of amplification between the output circuits of amplifier 21 and the inverter 33 and the input circuits of tubes 37 and 48. These amplifiers do not change the function of the system as previosly described in any way but merely afford additional gain to allow more positive operation of the system. These added amplifiers have not been given reference numbers as their connections and functions are obvious to one skilled in the art. Figure 2 also shows the details of one of the impedance transducers at or near the antenna of one of the electrostatic pickup antennas and the functioning of this device should be clear to one skilled in the art. In this connection, to minimize disturbances picked up by the transmission line, it is terminated with low impedance. In some instances it must also be shielded. The inductances 24, 25 and 26 are connected in series through the transmission line to the master circuit. The transient impulses developed by the electrostatic antennas appear initially across a high resistance. In order that approximately the same potentials be produced at the low resistance necessary to terminate the transmission lines, the impedance matching stage is used in each pickup, these stages being the assemblies 14, 15 and 16.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim:

1. A circuit for energizing indicating means in response to alternating signal impulses comprising a pair of electronic valves, each of said valves having a plurality of control elements, said valves having a common output circuit including said indicating means, means for deriving a pair of alternating voltages from the signal impulses phase inverted with respect to each other, means for applying said alternating voltages respectively to one of the control elements of each of said valves, means for deriving from the signal impulses a pair of substantially constant voltage pulses of opposite polarity and means for applying said constant voltage pulses respectively to the other control elements of each of said valves so that the constant voltage pulse applied to each valve is of opposite polarity to the first half cycle of said alternating voltage applied to the same valve, whereby only one of said valves will be energized and only at the end of the first half cycle of said signal impulse.

2. In combination, a source of alternating impulses of one cycle length, an indicating circuit and means for energizing said indicating circuit at the end of the first half cycle of said alternating impulse, said means comprising means for deriving from said impulses a pair of alternating voltages of one cycle length phase inverted with respect to each other, means for deriving from each of said alternating voltages a unidirectional, substantially constant voltage pulse of one cycle length, having a polarity opposite to the polarity of the first half cycle of the said alternating voltage from which derived, a pair of electronic valves having control elements, means for applying one of said alternating voltages and the unidirectional, substantially constant pulse derived from said alternating voltage to the control elements of one valve, means for applying the remaining alternating voltage and its derived unidirectional voltage pulse to the control elements of the other valve, said valves having a common output circuit including said indicating means.

3. A circuit for relaying alternating signal impulses to an indicating circuit comprising means for dividing said impulses into two phase inverted components, means supplying each of said components to a separate channel, each of said channels respectively terminating in an electronic valve having a plurality of control elements, both of said electronic valves feeding a common output circuit including indicating means, each of said channels having two branches, each branch being connected to one of said control elements, one of said branches transmitting an alternating impulse derived from the original signal impulse of the channel, the other of said branches including means to integrate the original signal impulse of the channel and means to phase invert and limit said integrated signal impulse whereby in each channel a substantially constant unidirectional signal impulse is applied to one of said control elements of each said electronic valve of opposite polarity to the polarity of the initial half cycle of signal impulse applied to said other control element and the last mentioned signal impulses in the two channels are reversed in polarity with respect to each other.

4. In combination, a source of alternating impulses of one cycle length, an indicating circuit and means for energizing said indicating circuit at the end of the first half cycle of said alternating impulse, said means comprising means for deriving from said impulses a pair of alternating voltages of one cycle length phase inverted with respect to each other, means for deriving from each of said alternating voltages a unidirectional, substantially constant voltage pulse of one cycle length, having a polarity opposite to the polarity of the first half cycle of the said alternating voltage from which derived, a pair of electronic valves having control elements, both of said valves having a common output circuit including said indicating circuit, biasing means for each of said electronic valves selected so that said valves will transmit impulses to said indicating circuit when a predetermined positive voltage is applied to one control element and the voltage on another control element approaches a positive polarity, means for applying one of said alternating voltages and the unidirectional, substantially constant pulse derived from said alternating voltage to the control elements of one valve, and means for applying the remaining alternating voltage and its derived unidirectional voltage pulse to the control elements of the other valve.

5. A circuit for relaying alternating signal impulses to an indicating circuit comprising means for dividing said impulses into two phase inverted components, means supplying each of said components to a separate channel, each of said channels respectively terminating in an electronic valve having a plurality of control elements, both of said electronic valves feeding a common output circuit including indicating means, biasing means for each of said electronic valves selected so that said valves will transmit impulses to said output circuit when a predetermined positive voltage is applied to one control element and the voltage on another control element approaches a positive polarity, each of said channels having two branches, each branch being connected to one of said control elements, one of said branches transmitting an alternating impulse derived from the original signal impulse of the channel, the other of said branches including means to integrate the original signal impulse of the channel and means to phase invert and limit said integrated signal impulse whereby in each channel a substantially constant unidirectional signal impulse is applied to one of said control elements of each said electronic valve of opposite polarity to the polarity of the initial half cycle of signal impulse applied to said other control element and the last mentioned signal impulses in the two channels are reversed in polarity with respect to each other.

6. In combination, a source of primary voltage pulses, said source producing said pulses at spaced time intervals, a plurality of indicating circuits, there being one circuit for each of said pulses, means for transmitting the first of said voltage pulses to one of said indicating circuits, means in each of said indicating circuits responsive to the voltage pulse conducted by such indicating circuit for rendering said circuit non-conductive to subsequent voltage pulses, and means interconnecting said indicating circuits for rendering the following indicating circuit conductive to said voltage pulses in response to conduction of said voltage pulses by the preceding indicating circuit.

7. In combination, a source of voltage pulses producing a fixed number of voltage pulses at spaced time intervals, a group of indicating circuits equal in number to the number of voltage pulses and commutation means transmitting successive pulses to successive indicating circuits, said commutation means comprising an electronic valve for each indicating circuit, the inputs of said valves being connected in parallel to said source of voltage pulses, the first of said valves having operating voltages applied thereto permitting said valve to transmit the first of said voltage pulses to the first of said indicating means, biasing means for each of the other said valves preventing their transmittal of said impulses, means connected to each of said valves except the first said valve for neutralizing said biasing means on any one valve in response to a voltage pulse transmitted by the preceding valve whereby successive voltage pulses are respectively transmitted by successive valves to successive indicating circuits, and impedance means in the circuit of each valve for interrupting the transmission of impulses by such valve, said impedance means having a time constant selected to hold said valve inoperative for a period greater than the time cycle for production of all successive pulses by said source.

8. In combination, a source of voltage pulses producing a fixed number of voltage pulses at spaced time intervals, a group of indicating circuits equal in number to the number of voltage pulses and commutation means transmitting successive pulses to successive indicating circuits, said commutation means comprising a primary electronic valve for each indicating circuit, the inputs of said valves being connected in parallel to said source of voltage pulses, the first of said valves having operating voltages applied thereto permitting said valve to transmit the first of said voltage pulses to the first of said indicating means, biasing means for each of the other said valves preventing their transmittal of said first impulse, said biasing means comprising an impedance connected in the cathode circuit of each of said valves, an auxiliary electronic valve supplying unidirectional current thru each of said impedances, and means for each of said auxiliary electronic valves arranged to reduce the current transmission by such auxiliary valve to permit its corresponding primary valve to transmit voltage pulses, said last mentioned means being respectively responsive to the transmission of voltage pulses by the preceding primary valve, and impedance means in the circuit of each primary valve effective to interrupt the transmission of impulses by each primary valve and to hold said primary valve inoperative for a period greater than the time cycle for production of all successive pulses by said source.

9. In combination, a source of primary voltage pulses, said source producing said pulses at spaced time intervals, a plurality of indicating circuits, there being one circuit for each of said pulses, said indicating circuits being arranged with their inputs connected in parallel with respect to said source, electronic valve means for maintaining all of said indicating circuits except the first non-conductive with respect to the first of said impulses, means interconnecting said indicating circuits for rendering the following indicating circuit conductive to said voltage pulses in response to conduction of said voltage pulses by the preceding indicating circuit, and means in each of said indicating circuits responsive to the voltage pulse conducted by such indicating circuit for rendering said circuit non-conductive to subsequent voltage pulses.

THOMAS D. CARR.